UNITED STATES PATENT OFFICE.

HUGH SPENCER ROBERTSON AND JOHN RAVENHILL GRAHAM, OF WALTHAMSTOW, ENGLAND, ASSIGNORS TO ROBGREY & COMPANY LIMITED, OF LONDON, ENGLAND.

PRODUCTION OF ARTIFICIAL FUEL AND COKE.

No. 877,738.   Specification of Letters Patent.   Patented Jan. 28, 1908.

Application filed June 18, 1907. Serial No. 379,628.

*To all whom it may concern:*

Be it known that we, HUGH SPENCER ROBERTSON and JOHN RAVENHILL GRAHAM, subjects of the King of England, both residing at Walthamstow, Essex, in England, have invented certain new and useful Improvements in or Relating to the Production of Artificial Fuel and Coke, of which the following is a specification.

This invention relates to improvements in the production of artificial fuel and coke, one object being to produce a substitute for coal or the like from anthracite or other coal dust or slack, coal washings, coal sludge and similar waste materials all or any of which are hereinafter included in the expression "the combustible material" and another object is to provide means for producing coke from these substances or from anthracite coal.

According to this invention, tar, crude naphtha or other tarry substance is mixed with a hydrocarbon oil such as petroleum, shale or Texas oil under such conditions as to produce a solid precipitate or residuum which can be separated from the remaining thin liquor. It is found that this precipitate is readily produced by mixing the tarry substance and the hydrocarbon oil in substantially equal proportions, agitating the mixture thoroughly, say for one hour and leaving it to settle for say twenty-four hours. The mixture may be effected at ordinary temperatures or at a temperature not exceeding 120° F.; the quantity of the precipitate may vary considerably according to the proportions or qualities of the ingredients. The precipitate or residuum can be dried say by heating it, and when dry forms a pulverulent and highly combustible substance.

One feature of this invention consists in the employment of the precipitate preferably in a dry pulverulent state as an admixture to the combustible material to increase their combustible properties and calorific value.

The thin fluid from which the precipitate has been separated is, according to this invention, employed in the production of a binding agent for artificial fuel. For this purpose resinous matter is dissolved in the liquor which is heated until it forms a thick viscous mass to form the binding agent; this mass may be mixed with a tarry substance substantially in equal proportions and a small proportion of common salt may be added.

In producing artificial fuel from the combustible material in accordance with this invention, the latter is reduced to a dry powder and thoroughly mixed with a small proportion of the dried precipitate produced as above described. To this solid pulverulent mass is added a suitable proportion of the binding agent produced as above described. The whole is mixed at a temperature at which incorporation takes place and the resulting product is pressed into blocks or briquets or otherwise treated to produce artificial fuel of the desired form. Or again according to this invention a binding agent of the kind described is mixed with suitable quantities of lime, pulverulent silica, such as silver sand, and saltpeter with or without a precipitate of the kind described, and the whole is heated. A small proportion of the resulting substance when mixed with the combustible material may be used for the production of a block fuel or briquets suitable for any of the purposes for which coal is ordinarily used and from which a coke may be obtained.

The following is a description by way of example of one method of carrying this invention into effect in the production of artificial fuel from coal slack: One hundred gallons of tar is mixed with one hundred gallons of petroleum the temperature being raised if required so as to facilitate thorough admixture. The mixture is thoroughly agitated say for one hour and left to settle until the solid precipitate is separated from the remaining thin fluid. As a matter of experience we find that such separation is complete in about twenty-four hours. The precipitate is then dried, conveniently at a temperature not exceeding 100° F. To produce the binding agent, the thin fluid is raised to a temperature of say 100° F: powdered or lump resin or similar substance is added in the proportion of one hundred-weight of resin to two hundred-weight of the fluid and the mixture is heated until it boils and forms a thick syrupy mass and is then left to cool, for, say twelve hours, whereby the binder is produced. To this is added tar, crude naphtha or similar tarry substance in the proportion of sixty pounds of tar to fifty-six pounds of the thick syrupy mass. To this may be added four pounds of common salt and the whole is again heated to effect thorough admixture. Coal slack in the form of a powder is mixed with a small quantity of pulverulent dried precipitate, produced as above described, in the proportion of say one ounce of dried precipitate to seven pounds of coal slack. A small quantity of the binder or emulsion is now incorporated with the powdered mixture in the proportion of half an ounce of the binder to one pound of mixture, and the whole is thoroughly mixed at a temperature of say 70° to 140° F., when the mixture is ready for forming into briquets or the like.

Another method of carrying this invention into effect is as follows: The tar and petroleum are mixed and agitated as before, and after standing as required the solid precipitate is separated from the thin liquid. As before, a binding agent is prepared from the thin liquid by the addition of resin, tar, etc. and thereafter the precipitate is added to the binding agent so as to produce a cohesive substance which will act both as a binding agent and to increase the combustible properties and calorific value of the materials with which it is mixed. For the purpose of forming a briquet from a mixture containing coal slack or the like, a small proportion of water may if desired be added.

According to another method of carrying out this invention, 15 lbs. of the binding agent may be mixed with 7 lbs. of the precipitate (either dry or as produced). To this is added 3/4 lbs. of slaked or unslaked lime, 1 lb. of silver sand or shell grit, 1 oz. saltpeter, with or without 1 oz. common salt. After heating this mixture it forms into a solid mass somewhat resembling pitch. In order to produce a fuel with the aid of this substance, it is mixed with the combustible material with or without a small proportion of the precipitate referred to in the proportion of about 3½% of this substance to 96½% of the combustible material, and the mixture is formed in any usual way into briquets or block fuel. When this fuel is burned in any grate or furnace, it is found that it tends to coke in a manner similar to ordinary bituminous coal.

In order to produce a coke, the binding agent is mixed with the combustible material in the above mentioned proportions. The mixture is heated and thoroughly agitated to incorporate the ingredients and may be formed into masses, lumps, blocks or briquets. When these are heated in the usual way in any ordinary coking furnace, it is found that a satisfactory and coherent coke is produced which has hitherto been impossible with anthracite and the like.

It is to be understood that the proportions of the ingredients and other details may be varied according to requirements without departing from this invention.

What we claim as our invention and desire to secure by Letters Patent is:—

1. The hereindescribed process for producing artificial fuel which consists in mixing tarry matter with hydrocarbon oil, separating the solid residuum precipitated and mixing it with combustible material.

2. The hereindescribed process for producing artificial fuel which consists in mixing tarry matter with hydrocarbon oil in substantially equal proportions, agitating the mixture, separating the solid residuum precipitated and mixing it with combustible material.

3. The hereindescribed process for producing artificial fuel which consists in mixing tarry matter with hydrocarbon oil in substantially equal proportions, agitating the mixture, warming the mixture, separating the solid residuum precipitated and mixing it with combustible material.

4. The hereindescribed process for producing artificial fuel which consists in mixing tarry matter with hydrocarbon oil agitating the mixture, allowing it to settle, separating the solid residuum precipitated, drying the residuum to form a powder and mixing the residuum with combustible material.

5. The hereindescribed process for producing artificial fuel which consists in mixing tarry matter with hydrocarbon oil, separating the solid residuum precipitated, dissolving resinous matter in the thin fluid residue to form a binding agent and mixing the binding agent with combustible material.

6. The hereindescribed process for producing artificial fuel which consists in mixing tarry matter with hydrocarbon oil separating the solid residuum precipitated, dissolving resinous matter in the thin fluid residue, adding tar thereto to form a binding agent and mixing the binding agent with combustible material.

7. The hereindescribed process for producing artificial fuel which consists in mixing tarry matter with hydrocarbon oil, separating the solid residuum precipitated, dissolving resinous matter in the thin fluid residue, adding tar and common salt thereto to form a binding agent and mixing the binding agent with combustible material.

8. The hereindescribed process for producing artificial fuel which consists in mixing tarry matter with hydrocarbon oil, separating the solid residuum precipitated, dissolving resinous matter in the thin fluid residue to form a binding agent and mixing the solid residuum and the binding agent with combustible material.

9. The hereindescribed process for producing artificial fuel which consists in mixing tarry matter with hydrocarbon oil, agitating the mixture, allowing it to settle, separating the solid residuum precipitated, dissolving resinous matter in the thin fluid residue, adding tar thereto to form a binding agent and mixing the solid residuum and the binding agent with combustible material.

10. The hereindescribed process for producing artificial fuel which consists in mixing tarry matter with hydrocarbon oil, agitating the mixture, allowing it to settle, separating the solid residuum precipitated, drying the residuum to form a powder, dissolving resinous matter in the thin fluid residue, adding tar thereto to form a binding agent and mixing the solid residuum and the binding agent with combustible material.

11. The hereindescribed process for producing artificial fuel which consists in mixing tar with petroleum, agitating the mixture, allowing it to settle, separating the solid residuum precipitated and mixing it with powdered coal.

12. The hereindescribed process for producing artificial fuel which consists in mixing tar with petroleum, agitating the mixture, allowing it to settle, separating the solid residuum, dissolving resin in the thin fluid residue to form a binding agent and mixing the binding agent with powdered coal.

13. The hereindescribed process for producing artificial fuel which consists in mixing tar with petroleum, agitating the mixture, allowing it to settle, separating the solid residuum, dissolving resin in the thin fluid residue, adding tar thereto to form a binding agent and mixing the binding agent with powdered coal.

14. The hereindescribed process for producing artificial fuel which consists in mixing tar with petroleum, agitating the mixture, allowing it to settle, separating the solid residuum precipitated, dissolving resin in the thin fluid residue, adding tar thereto to form a binding agent and mixing the solid residuum and the binding agent with powdered coal.

15. The hereindescribed process for producing artificial fuel which consists in mixing tar with petroleum, agitating the mixture, allowing it to settle, separating the solid residuum precipitated, drying the residuum to form a powder, dissolving resin in the thin fluid residue, adding tar thereto to form a binding agent and mixing the solid residuum and the binding agent with powdered coal.

16. The hereindescribed process for the production of artificial coking fuel which consists in mixing tar with petroleum, agitating the mixture and allowing it to stand, separating out the solid residuum precipitated, dissolving resin in the thin fluid residue, adding tar, lime, pulverulent silica and saltpeter thereto to form a binding agent and mixing the binding agent with powdered coal.

17. The hereindescribed process for the production of artificial coking fuel which consists in mixing tar with petroleum, agitating the mixture and allowing it to stand, separating out the solid residuum precipitated, dissolving resin in the thin fluid residue, adding tar, lime, pulverulent silica and saltpeter thereto to form a binding agent and mixing the binding agent with powdered anthracite coal.

18. The hereindescribed process for the production of artificial coking fuel which consists in mixing tar with petroleum, agitating the mixture and allowing it to stand, separating out the solid residuum precipitated, dissolving resin in the thin fluid residue, adding tar, lime, pulverulent silica and saltpeter thereto to form a binding agent and mixing the solid residuum and the binding agent with powdered anthracite coal.

In testimony whereof we have signed our names to this specification in the presence of two subscribing witnesses.

HUGH SPENCER ROBERTSON.
JOHN RAVENHILL GRAHAM.

Witnesses:
W. B. PEARSON,
WILLIAM HENRY BALLANTYNE.